United States Patent [19]

Eddy

[11] Patent Number: 4,836,463
[45] Date of Patent: Jun. 6, 1989

[54] ENDLESS LOOP TRANSPORT AND STORAGE SYSTEM

[75] Inventor: Richard P. Eddy, Gardena, Calif.

[73] Assignee: Christie Electric Corporation, Torrance, Calif.

[21] Appl. No.: 68,325

[22] Filed: Jul. 1, 1987

Related U.S. Application Data

[63] Continuation-in-part of Ser. No. 936,399, Dec. 1, 1986.

[51] Int. Cl.⁴ .............................................. B65H 17/48
[52] U.S. Cl. .............................. 242/55.19 R; 352/128
[58] Field of Search ........................... 242/55.18, 55.19; 352/128

[56] References Cited

U.S. PATENT DOCUMENTS

| | | | |
|---|---|---|---|
| 3,352,506 | 11/1967 | Bodrov et al. | 242/55.18 |
| 3,863,852 | 2/1975 | Rackett et al. | 242/55.19 R |
| 4,186,891 | 2/1980 | Johnson | 242/55.19 R |
| 4,208,018 | 6/1980 | Wilkinson | 242/55.19 R |
| 4,448,362 | 5/1984 | Johnson | 242/55.19 R |
| 4,504,025 | 3/1985 | Potts | 242/55.19 R |
| 4,708,447 | 11/1987 | Kuoni | 242/55.19 R |

*Primary Examiner*—Stuart S. Levy
*Assistant Examiner*—Katherine Matecki
*Attorney, Agent, or Firm*—Harris, Kern, Wallen & Tinsley

[57] ABSTRACT

An apparatus and method for continuously storing a strip of material in a coil, such as a multi-hour motion picture theatre film. The apparatus includes a flat platter with drive means for rotating the platter, a cam mounted for rotation with the platter and having a cam track with alternating sections of greater distance and lesser distance from the center of the platter, and means for applying the incoming strip to the periphery of the coil on the platter. The applying means includes a cam follower for engaging the cam track to position the strip in a coil on the platter having inwardly directed rounded cusps with arcuate outer peripheries therebetween. In order to reduce or eliminate tension in the strip, a roller is positioned at the outer periphery for urging the coil inward as the roller contacts the coil. Further improvements include provision of a high friction surface on the platter for enhancing arc formation and a low friction surface for enhancing cusp formation, and a takeoff roller assembly positioned above the platter for improved strip takeoff operation.

32 Claims, 11 Drawing Sheets

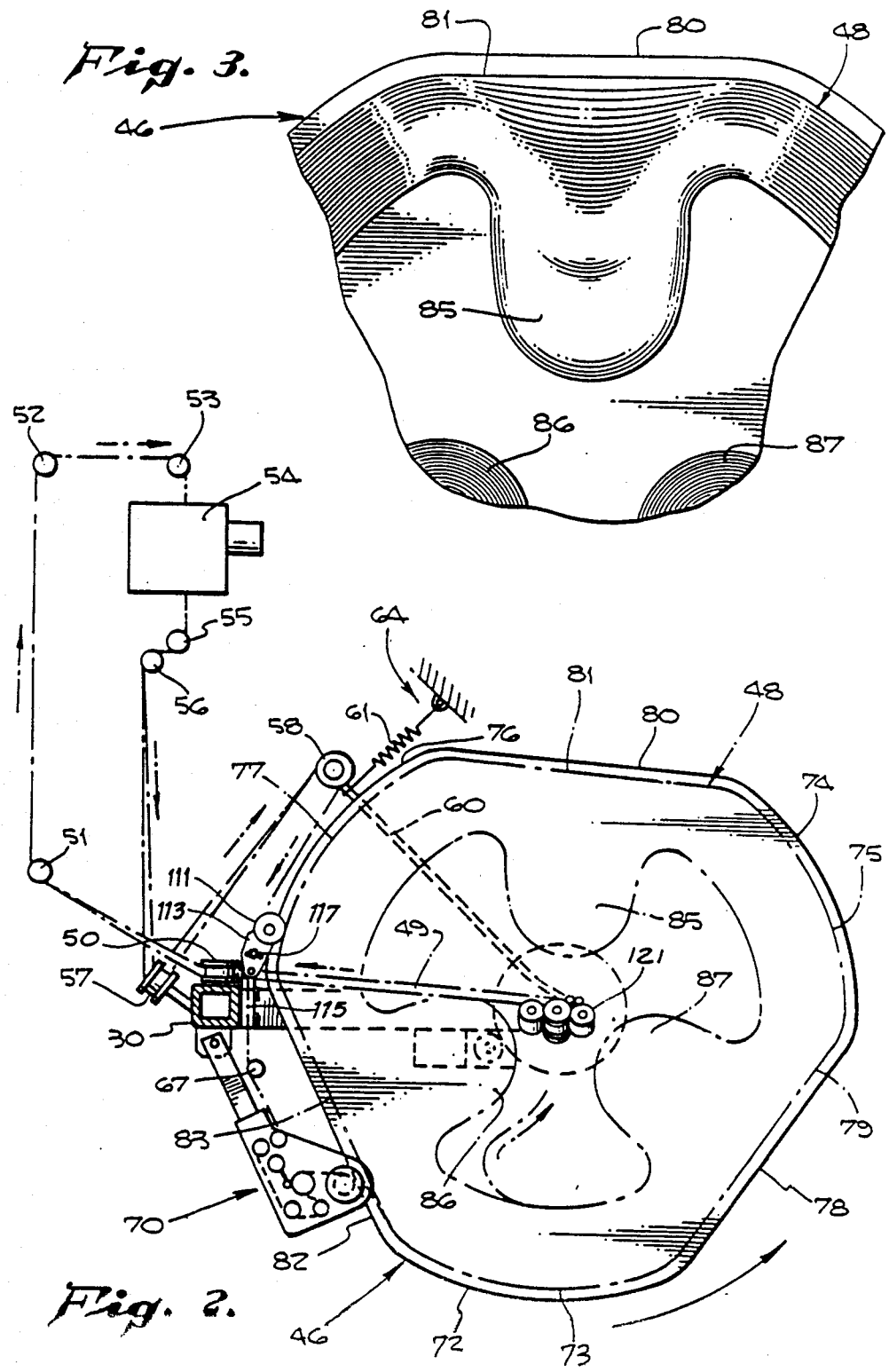

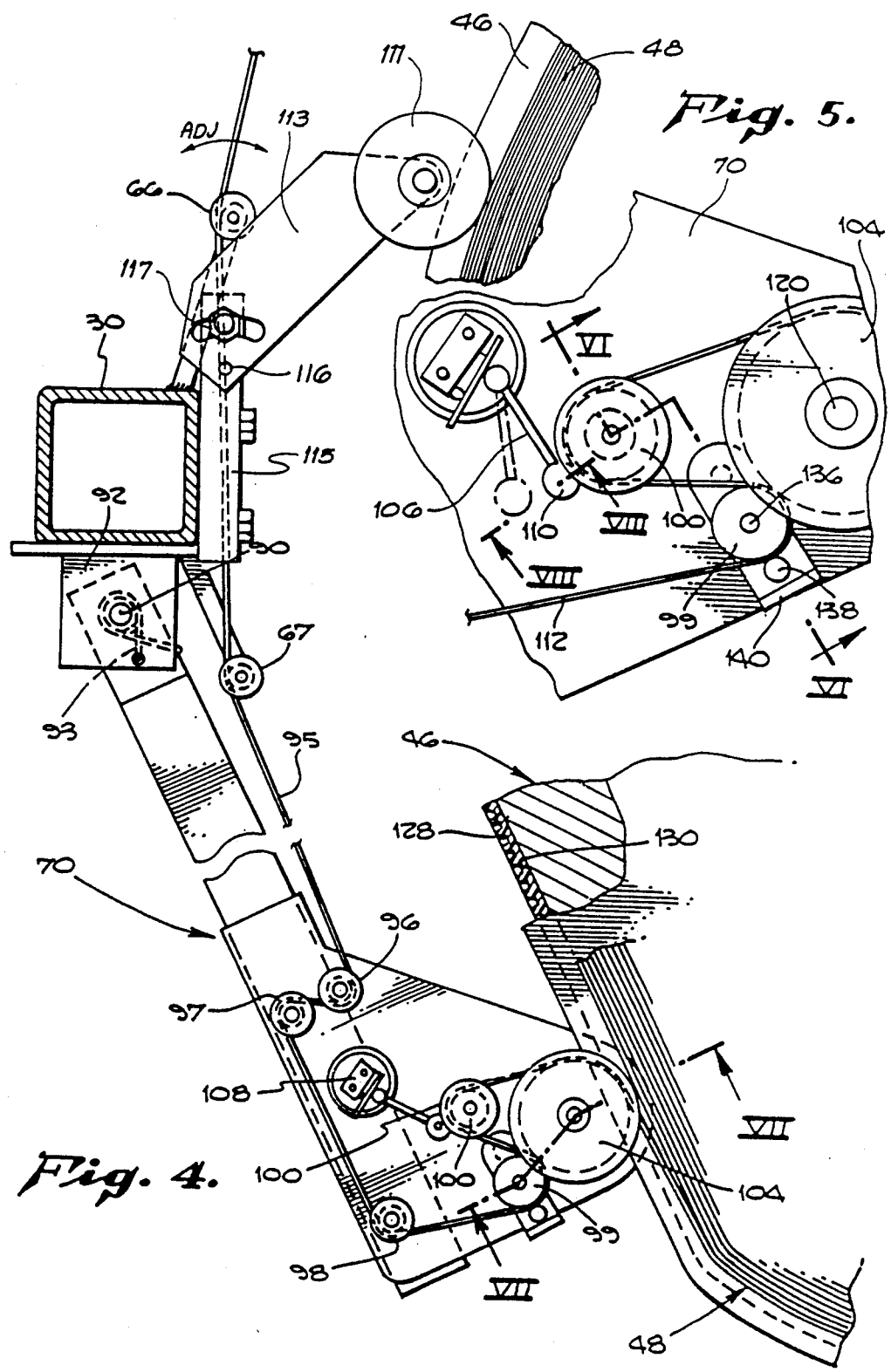

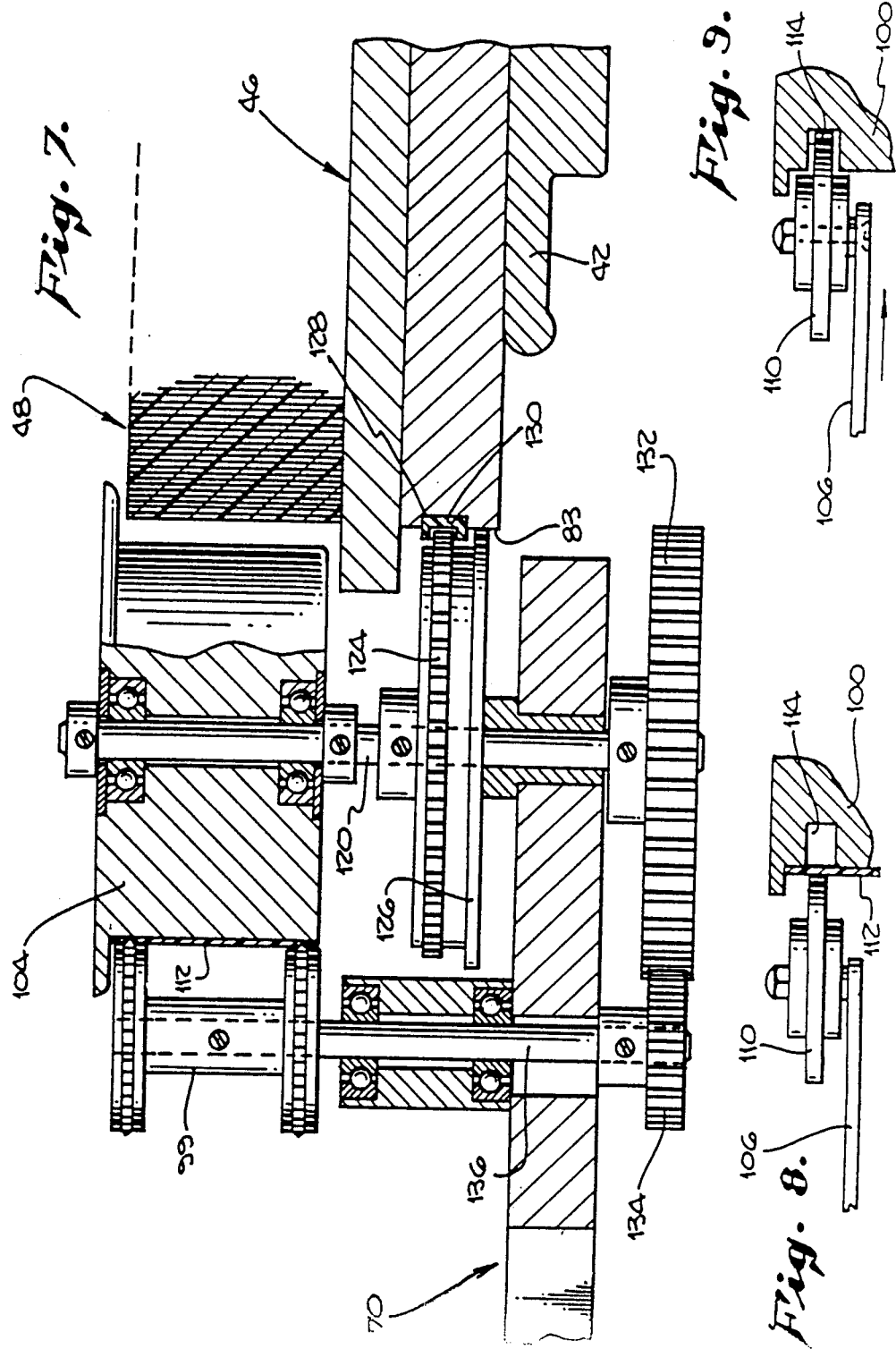

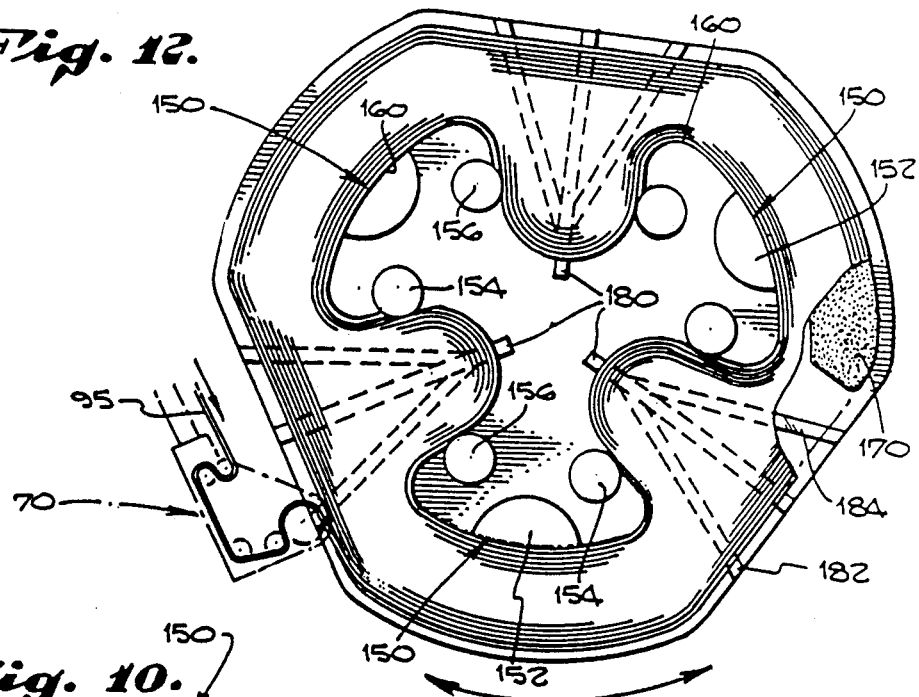
Fig. 12.
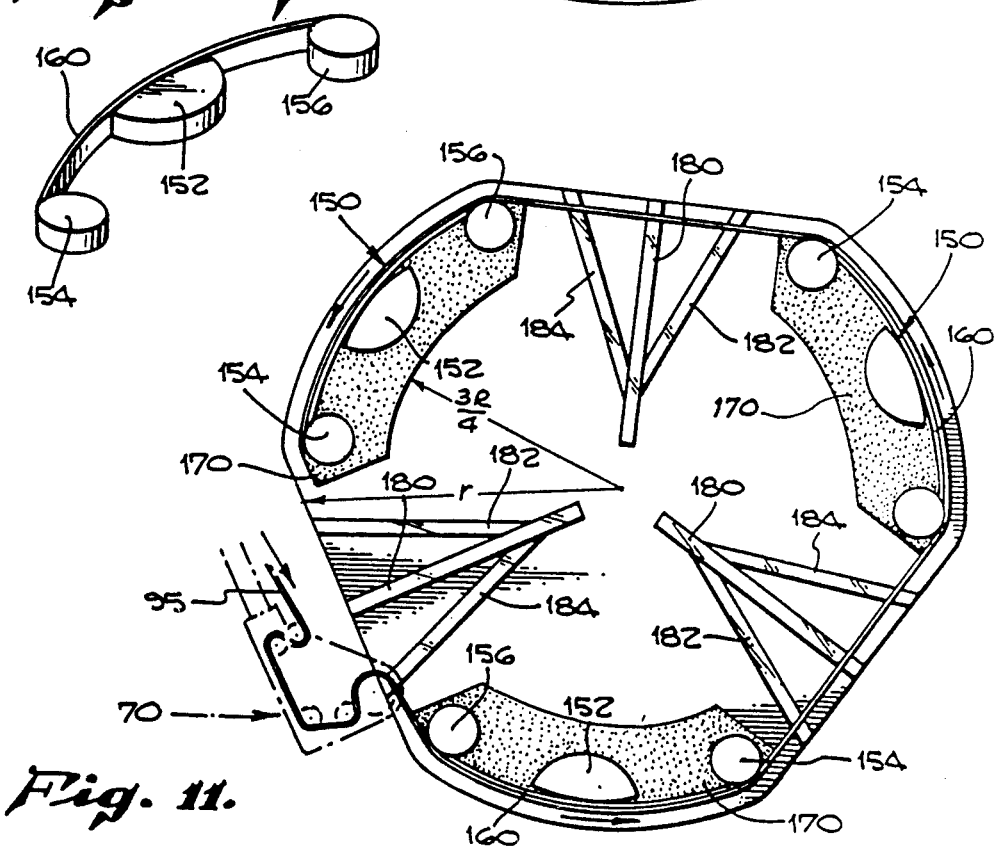
Fig. 10.
Fig. 11.

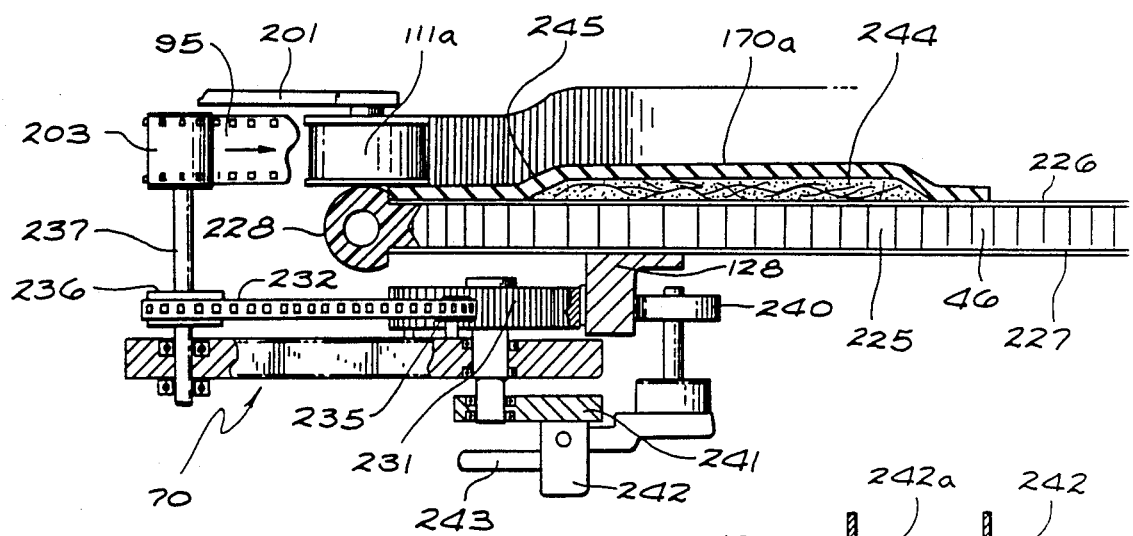
FIG. 17
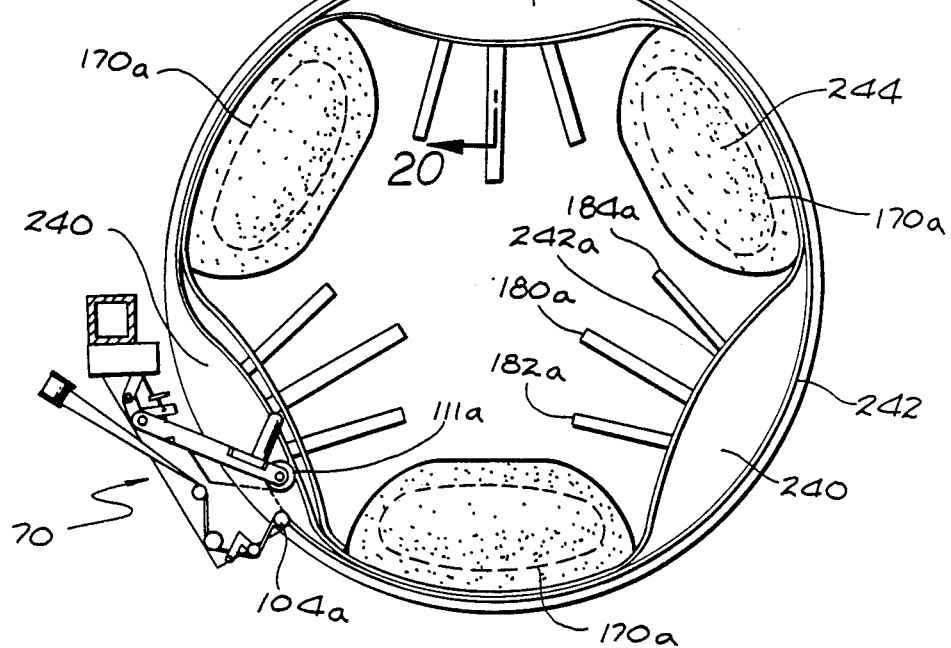
FIG. 20
FIG. 19

ENDLESS LOOP TRANSPORT AND STORAGE SYSTEM

CROSS REFERENCE TO RELATED APPLICATION

This application is a continuation-in-part of the copending application of the same title U.S. Ser. No. 06/936,399, filed Dec. 1, 1986, and assigned to the same assignee as is the present application.

BACKGROUND OF THE INVENTION

This invention relates generally to a system for storing a quantity of continuous strip material such as tape or film. More particularly, the invention describes a method and apparatus for continuously storing motion picture film on edge on a flat rotating platter, as part of an endless loop film projection system.

It has long been recognized in motion picture projection that an endless loop system is desirable, in order to eliminate the need for manual rewinding and rethreading of film in repeated renditions of a program. A number of attempts have been made to provide for storing the film in a coil on a rotating turntable or platter in such a way as to minimize relative longitudinal movement between adjacent film layers in the coil, and yet permit, during each platter revolution, a predetermined length of film to be withdrawn from the center of the coil while the identical length of film is being added to the outside of the coil. The prior systems produce a series of angularly spaced, inwardly directed rounded cusps in the film coil, and are exemplified by the two U.S. patents to Johnson, U.S. Pat. Nos. 4,066,221 and 4,186,891, the U.S. Pat. No. 4,208,018 to Wilkinson, and the U.S. Pat. No. 4,504,025 to Potts. These patents, in common with other prior systems include an application apparatus for incoming film which feeds or applies the incoming film to the rotating platter and means for shaping the film in the coil into a number of spaced inwardly directed cusps.

In another apparatus, the strip or film is transported from the edge of the platter toward the center of the coil by the tension of the strip in the outer layers. A cam is carried for rotation with the platter, with the cam having alternating sections of greater distance and lesser distance from the center, typically comprising arcuate sections and chord sections, respectively. The strip is applied to the outer periphery of the coil by a mechanism which includes a cam follower riding on the cam track as the platter rotates. This apparatus provides the desired cusps in the coil of film, but also involves an undesired tensioning of the film with a resultant rubbing of one layer of film against the adjacent layer. This operation is illustrated in FIG. 14. A white chalk line 20 was applied as a straight line or radius on a coil 21 of film resting on a platter 22. This line 20 was extended to the outer periphery of the coil and an index line 23 was applied at the edge of the platter 22 aligned with the line 20. The apparatus was then operated in the normal manner for ten minutes resulting in application of additional film indicated at 24. The slippage of one layer of the film strip relative to the next during the film application is demonstrated by the curve in the line 20.

Motion picture film has a tendency to curl when a length of the film is in an unwound strip condition; as is the case when film is moving from the projector to the coil on the platter. Curling is a problem caused by the change in dimension of the emulsion side of the film with respect to the base side of the film and is exaggerated by changes in such things as temperature and humidity.

Accordingly, it is an object of the present invention to provide a new and improved method and apparatus for continuously storing a strip of material in a coil and incorporating the advantages of the prior cam and cam follower system, while overcoming the disadvantages thereof. A particular object of the invention is to provide such a method and apparatus including means for relieving tension in the applied strip, as by addition of a pressure roller for contacting the arcuate periphery of the coil and urging it inward. The pressure roller may contact the coil only at a fixed radius or may contact the coil continuously.

It is a further object of the invention to provide an improvement in film handling systems by controlling the friction of the coil on the platter and more particularly by providing a continuous friction producing surface on the platter at the arcuate sections thereby facilitating cusp formation and enhancement. The friction producing surface may have an elevated outer contour to aid in developing the arcuate shape of the coil.

It is another object of the invention to achieve a further improvement in film handling by providing a skid or low friction surface on the platter in the cusp sections of the coil with such surface having an elevated inner contour corresponding to the desired cusp configuration.

It is an object of the invention to provide a new and improved cam track and cam follower construction for control of the application of the strip to the coil including pressure roller and application roller position control, drive mechanism and/or platter and cam track configuration.

Another problem encountered with prior art systems is the positioning of the strip at the center of the coil during takeoff, and control of the strip immediately after its removal from the inside of the coil. In prior art configurations, the takeoff guide, typically a takeoff roller or set of rollers, is positioned at the center of the coil and limits the motion of the strip during takeoff. It is an object of the present invention to provide an improvement on this configuration and in particular, to position a takeoff roller assembly above and spaced from the coil at the center of the coil thereby doing away with restrictions on strip movement.

These and other objects, advantages, features and results will more fully appear in the course of the following description.

SUMMARY OF THE INVENTION

Apparatus and method for continuously storing a strip of material in a coil on a flat platter having a cam mounted for rotation with the platter, with the cam having a cam track with alternating sections of greater and lesser distance from the center. Means for applying the incoming strip to the periphery of the coil and including a cam follower for engaging the cam track and varying the distance from the center to the point of application of the strip, an application roller for guiding the strip onto the coil, and an additional roller mounted in a location adjacent the platter for engaging the coil as the platter rotates for urging the coil inward toward the center and relieving tension in the strip on the platter. The preferred embodiment also incorporates an arrangement for monitoring and controlling the tension of the strip between the metering sprocket and the coil being wound onto the platter per revolution.

A friction producing surface on the platter continuously covering that portion of the platter over the cam track sections of greater distance from the center, which friction producing surface extends from adjacent the periphery of the platter at least part way to the center, and preferably which has an elevated outer contour for uniform arc formation. A low friction surface on the platter continuously covering that portion of the platter over the cam track sections of lesser distance from the center, which surface preferably has an elevated inner contour for uniform cusp formation and to aid in flow toward the center.

A strip takeoff roller assembly positioned between the coil of the strip at the center of the platter and the projector or other strip use device, with the assembly positioned above the platter and spaced from the coil and thereby providing for freedom of motion of the strip during takeoff.

BRIEF DESCRIPTION OF THE DRAWINGS

FIG. 2 is a top plan view of the major components of an endless loop system embodying the present invention, including the platter and the film application roller assembly and, diagrammatically shown, the film path to and from a film projector; on the platter in dotted outline is shown the approximate contour of the innermost layer of the film winding when the platter is substantially fully loaded.

FIG. 3 is a fragmentary plan view on an enlarged scale of the upper portion of the platter as seen in FIG. 2, showing one of the inwardly directed cusps formed in the film winding, the film being shown substantially fully loaded on the platter.

FIG. 4 is a fragmentary view on an enlarged scale of the lower left portion of FIG. 2, showing details of the film application arm and tension relieving roller and their interengagement with the platter and film.

FIG. 5 is a fragmentary view on an enlarged scale of the distal portion of the film application arm, showing the path of film immediately before it reaches the application roller, and including an illustrative fail-safe mechanism of the system.

FIG. 7 is a sectional view on a greatly enlarged scale taken on arrows VII—VII of FIG. 4.

FIG. 8 is a fragmentary view taken on arrows VIII—VIII of FIG. 5 showing details of the fail-safe mechanism in its normal operating condition.

FIG. 9 is a view similar to FIG. 8 except showing the fail-safe mechanism when it has been actuated by a defect or break in the film.

FIG. 10 is a perspective view of a set of template blocks used to assist in shaping successive film layers during the process of loading or make-up in accordance with the present invention.

FIG. 11 is a plan view of the platter of the present system with the first layer of film in place, in condition for the commencement of the loading or make-up process.

FIG. 12 is a plan view similar to FIG. 11 showing the platter as make-up is virtually complete.

FIG. 17 is an enlarged partial sectional view taken along the line 17—17 of FIG. 16.

FIG. 19 is a view similar to that of FIG. 11 showing an alternative and presently preferred embodiment of the invention.

FIG. 20 is an enlarged partial sectional view taken along the line 20—20 of FIG. 19.

DESCRIPTION OF THE PREFERRED EMBODIMENTS

Figure 1:
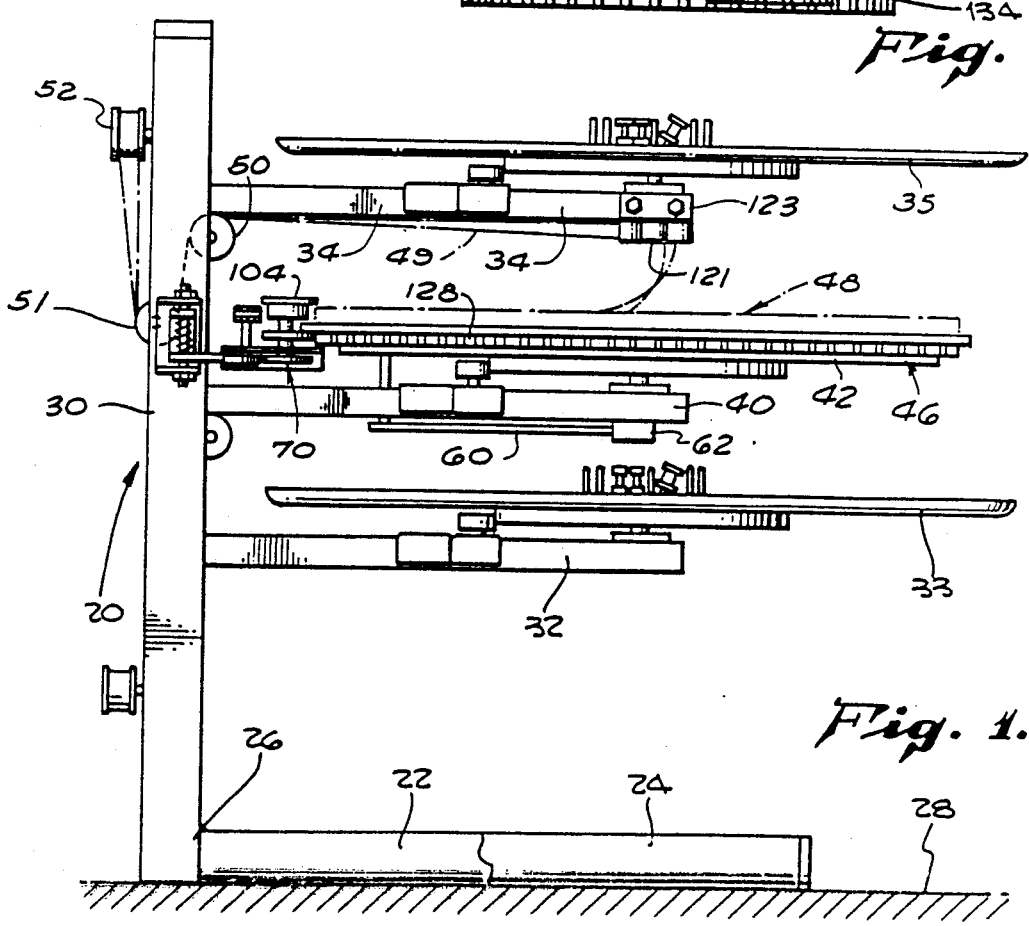
FIG. 1 is a side elevational view of a conventional film winding machine with the system of the present invention mounted on the center of the three turntables.

In the drawings, FIG. 1 shows a film winding machine of generally conventional construction, modified to embody a system of the present invention. The machine includes a rigid support structure indicated generally at 20 including a pair of lower support legs 22, 24 forming a V with the vertex 26 at the left, resting on the floor 28. From the vertex 26 an upright post 30 extends upwardly. Support arms 32 and 34 are fixed to post 30 and project horizontally, each supporting a rotatable turntable 33 and 35 respectively on which a film is stored, on edge, in use.

A third support arm 40 extends horizontally between the other arms and carries a rotatable turntable 42. Attached to the upper side of turntable 42 is a platter indicated generally at 46 on which a quantity of film indicated generally at 48 is supported on its edge. The film path during operation includes an upwardly inclined exiting film portion 49 extending from the center of the platter to a guide roller 50 mounted on the post 30.

FIG. 2 shows the exiting film portion 49 passing over guide roller 50, and as diagrammatically shown, over guide rollers 51, 52 and 53 to a film projector 54. The film return path from the projector passes over guide rollers 55, 56, 57 and 58, the latter roller being carried at the outer end of a speed control arm 60. The latter arm extends radially beneath the turntable to a speed control means 62 which controls the speed of rotation of the turntable 42. As diagrammatically indicated at 64, the outer end of speed control arm 60 is biased in a clockwise direction by a spring 61 as seen in FIG. 2, in order to maintain a desired tension on the film entering and exiting the guide roller 58. The speed control means may be one of those presently in use on endless loop film handling system.

From guide roller 58 the exiting film moves via guide rollers 66 and 67 to the film application arm indicated generally at 70; the film path there will be described in detail in connection with FIGS. 4 and 5.

With continued reference to FIG. 2, it will be seen that the contour of the periphery of platter 46 includes a plurality of arcuate sections alternating with straight sections, there being three of each of the two types of sections in the preferred form of the invention illustrated. Thus arcuate sections 72, 74 and 76 alternate with straight sections 78, 80 and 82. Recessed inwardly from the periphery of the platter, and seen in dotted outline in FIG. 2 is the contour of a cam track, geometrically similar to the periphery of the platter, and including arcuate sections 73, 75 and 77, alternating with straight sections 79, 81 and 83. As shown, the periphery of the platter projects beyond the periphery of the cam track, forming an annular projection of substantially uniform equal width immediately inwardly of the platter rim. This annular projection prevents the possibility that, during the winding operation, one or more of the outer layers of film might fall off the edge of the platform. As will be later understood, it is the contour of the periphery of the cam track which is important in the operation of the present invention. This aspect is emphasized in FIG. 3, showing a portion of the platter almost fully loaded with film.

The outermost layer of film 48, as it is being wound onto the platter, is vertically aligned with the cam track. The layers applied earlier to the platter will have been incrementally forced inwardly successively as each new outer layer of film is continuously applied in alignment with the cam track. The earlier applied layers of film are thus shaped into a plurality of inwardly directed rounded cusps, one cusp opposite each of the flats or straight sections of the cam track.

Thus cusp 85 is located radially inward of straight section 81 of the cam track, and similar cusps partially seen at 86 and 87 are located radially inward of the other two straight sections of the cam track. For proper shaping of the cusps, each of the straight sections and the arcuate sections of the cam track subtends an angle of about 60° at the center of the turntable.

With reference to FIG. 4, metering and application roller arm 70 is pivotally mounted at 90 to a bracket 92 fixed to vertical post 30. Resilient means such as spring 93 urge arm 70 counterclockwise toward the platter 46. Incoming film 95 moves past guide rollers 66 and 67, then past guide rollers 96, 97 and 98, film sprocket 99, and around fail-safe roller 100 to the film application roller 104, which applies the film to become the outermost layer of the coil of film 48 on the platter 46.

Fail-safe means are provided to sense the continuous running of the film and to detect any break in the film, particularly a longitudinal split. One embodiment is shown in FIGS. 4, 5, 8 and 9, where a sensor arm 106 is pivotally mounted at 107 to a microswitch unit 108, and is biased lightly counterclockwise. The distal tip 110 of arm 106 continuously senses the existence of the moving film on roller 100. Operation of the device is described with reference to FIGS. 8 and 9. In FIG. 8 the sensor tip 110 lightly contacts film 112 during operation. In FIG. 9 the film 112 is no longer present, as would occur in the event of a film break, and the sensor tip is biased into a groove 114 formed in the roller 100. This movement, in known manner, actuates a microswitch in unit 108, thus stopping the projector and other moving parts of the system. A second microswitch may be symmetrically disposed to sense the film near the outer edge of roller 100. In an alternative embodiment, an all electronic design can be used.

In FIG. 7 are shown details of construction of the film metering and application roller assembly. Near the distal end of pivotal arm 70 is journaled a vertical shaft 120. On its upper portion the film application roller 104 is freely journaled. About midway of its length shaft 120 has fixedly mounted thereon a gear 124 and a cam follower disk 126. The disk is in contact with straight section 83 of the platter cam track. Gear 124 is in mesh with gear belt 128, which is partially recessed in a peripheral groove 130 formed in the platter cam track. The gear belt is continuous around the periphery of the cam track.

The lower end of shaft 120 has fixedly mounted thereon a spur gear 132 whose pitch diameter is equal to the diameter of disk 126, and gear 132 drives a smaller gear 134 fixed on the lower end of a countershaft 136, on the upper end of which is fixedly mounted sprocket 99.

It will thus be seen that during rotation of the platter 46, shaft 120 and countershaft 136, and thus film sprocket 99 are all moved at speeds exactly proportional to and synchronized with the linear speed of the cam track.

Figure 6:
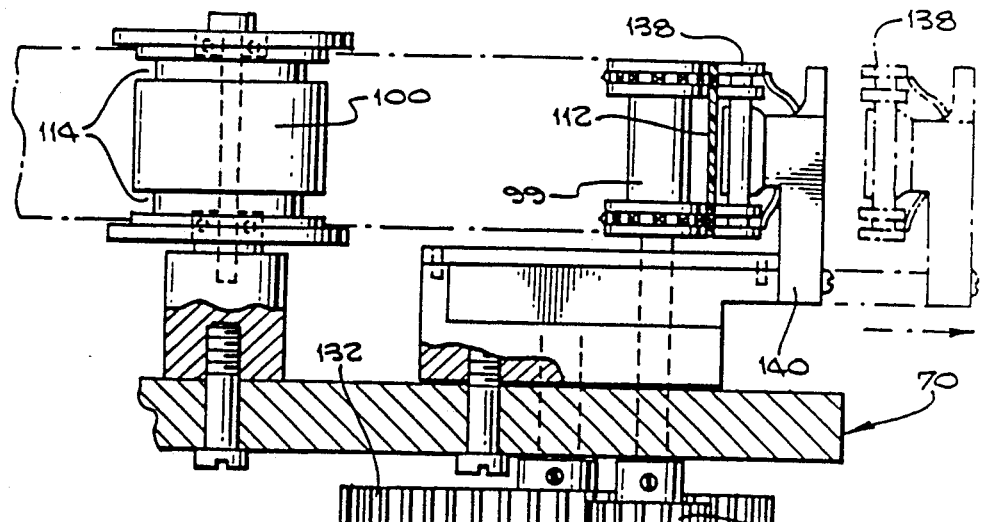
FIG. 6 is a sectional view taken on arrows VI—VI of FIG. 5 showing details of the drive mechanism for the metering sprocket gear.

FIG. 6 sows the relationship and functioning of sprocket 99, and fail-safe roller 100, and their associated parts. A film retainer pad or keeper 138 is carried on an arm 140, with the pad serving to urge the film against the sprocket 99. The arm 140 is slidable between the solid line position with the pad engaging the film, and the phantom line position with clearance between the pad and sprocket for insertion or removal of film. In an alternate configuration, the arm may be pivoted rather than sliding.

FIGS. 10 and 11 show the use of template means to assist in the original loading or make-up of a filmed program which is to become part of an endless loop in accordance with the invention. FIG. 10 shows the template means proper, indicated generally at 150 and including a central template block 152 and a pair of laterally spaced blocks or wings 154, 156, the three blocks being joined together to form a set by a strip 160 attached to the blocks. The width of the strip and the height of the template blocks is generally similar to the width of the film being stored. The strip is stiff enough to assume and initially retain its original position seen in FIG. 10, with the strip 160 in an arcuate shape, as seen in FIG. 11, substantially congruent with a portion of the outer circumference of the coil of film to be stored. Other forms and constructions may be utilized for the template means, if desired. By way of example, an elongate sandbag is used in one embodiment.

As appears in FIG. 11, one template set 150 is provided for each of the three arcuate sections of the coil being formed. At the beginning of loading or make-up the leading end of the film may be attached to one of the template blocks.

The wing blocks resist breakdown of the ends of the arcuate film sections until a sufficient number of layers of film have been applied to the coil to give the coil stability. As stability is attained the flexibility of the template strip 160 permits it to bend, and thus to allow the template wing blocks 154, 156 to move radially inwardly toward their final positions seen in FIG. 12. With make-up thus completed, the leading end of the film is detached from the template block, all template sets are removed, and the leading end of the film is threaded through the film path previously described, to be spliced to the tail end of the film program to form the endless loop. Rendition of the program can then be repeated as many times as desired without further attention by the operator.

As best seen in FIG. 11, one or more elongated skid strips may be provided on the upper surface of the platter to assist the portions of film forming the cusps to move smoothly toward the center of the platter during operation. Thus, with continued reference to FIG. 11, extending radially upwardly from the center of each of the chord portions or straight section of the platter is a strip 180, by preference made of teflon or similar material of low friction. As will be understood, this provides a skid surface for the lower edge of the film as each layer moves inwardly during operation. Additional flanking strips 182 and 184 may be provided to increase the assistance given to the film layers in their inward movement.

The parts thus far described are conventional and known in the art. The apparatus of the present invention, to be now described, may be incorporated into existing non-endless loop film handling systems as a retrofit, or may be utilized in a new endless loop film handling system.

As seen in FIGS. 2 and 4, a roller 111 is mounted on a plate 113 which in turn is carried on a bar 115 attached to the upright post 30. In operation, the roller 111 is maintained in a fixed position with respect to the center of rotation of the platter. However, the roller position may be adjusted, as by having the plate 113 pivot about a pin 116 on the bar 115, with a bolt 117 passing through a slot in the plate 113 and threaded into the bar 115 for locking the plate and hence the roller in a desired location.

Figure 13:
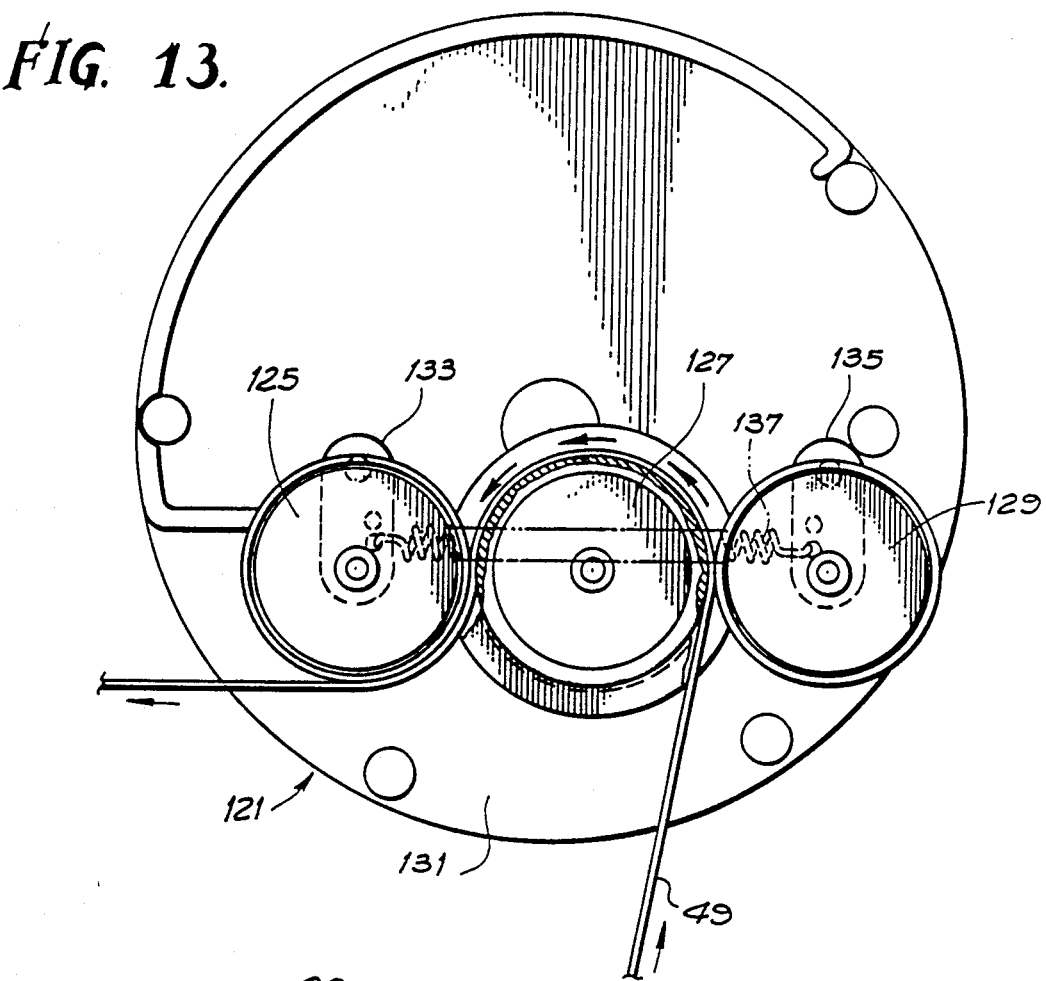
FIG. 13 is an enlarged plan view of the takeoff roller assembly of FIG. 1.

A takeoff roller assembly 121 is supported on the arm 34 in a position above and spaced upward from the platter or turntable 42, as is shown in FIG. 1. The roller assembly 121 may be conventional in construction, such as that shown in U.S. Pat. No. 4,144,991, and is shown in better detail in FIG. 13. Rollers 125, 127 and 129 are carried on a plate 131 in spaced relation. The roller 127 is directly mounted on the plate, while roller 125 is carried on a link 133 pivoting on the plate 131, and roller 129 is carried on a similar link 135. The links are urged toward each other by a spring 137 thereby urging each of the rollers 125 and 129 toward the roller 127. The strip of film 49 passes between the rollers 127 and 129, around the roller 127, and between the rollers 127 and 125.

As an aid in obtaining the shape of the arcuate sections of the coil, an anchor pad 170 has been provided on the surface of the platter beneath the initial position of each of the arcuate sections of the coil, as shown in FIG. 11. Typically these pads are made of a material such as a rubbery substance having a high coefficient of friction. Preferably the pads extend from the periphery inward toward the center for about one quarter of the radius.

In operation without the pusher roller 111, tension is built up in the film strip as the circumference of the film on the coil increases to the point where the circumference is greater than that permitted by the metering sprocket. At this point, the tension in the outer windings causes the preceding layers of film to progress toward the center of the coil. This action aids in forming the cusps because the resistance of the film to form loops is least at the flats or straight sections.

A disadvantage of this mode of operation is the cinching motion of the outer layers of the film which, while aiding in producing the desired cusps, also produces rubbing of one layer of film against the next layer. This action is illustrated in FIG. 14.

Incorporation of the pusher roller 111 into the device acts to reduce or eliminate the tension and the resultant cinching action. As best seen in FIG. 2, the roller 111 is positioned to contact the outer layer of the film in the arcuate sections. By precisely positioning the roller, the roller functions to push the film inward an amount about equal to the thickness of the film as each arcuate section passes the roller. This action moves the film inward to the same degree that the cinching action of the prior art device moved the film inward, but eliminates the cinching action and the accompanying rubbing of one layer of film against the next.

Figure 14:
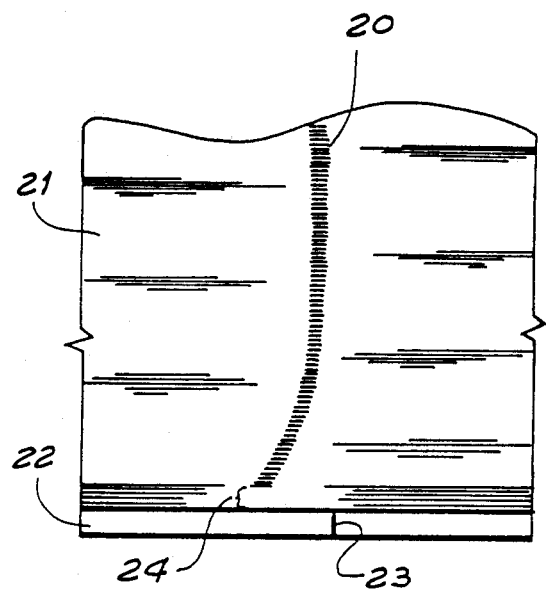
FIG. 14 is an diagram drawn from a photograph illustrating the operation of the prior art mechanism.
Figure 15:
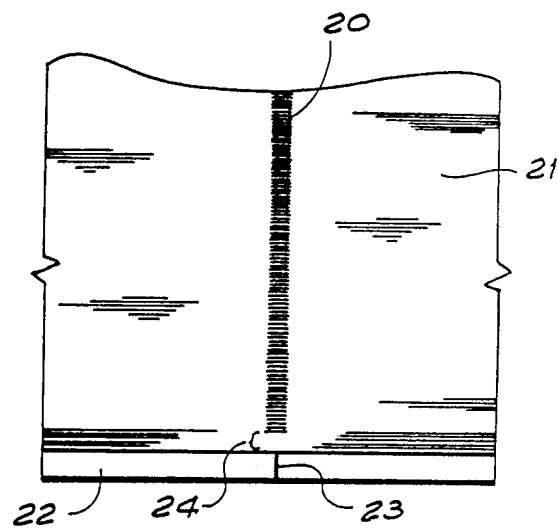
FIG. 15 is a similar diagram illustrating the operation of the apparatus of the present invention.

This action is illustrated in the diagram of FIG. 15 which illustrates the operation of the apparatus used for producing the diagram of FIG. 14, but with the addition of the pressure roller 111. The white line 20 was applied to the film coil 21, and the apparatus was then operated for ten minutes. The illustration of FIG. 15 shows that substantially no cinching action occurred during the application of the film. The operation of the apparatus was otherwise the same as that for the result illustrated in FIG. 14.

Another problem encountered with the prior art configuration is that the film being taken off from the center of the coil is not always the same length as that which is being applied at the outer periphery. Film can change length considerably due to changes in humidity or temperature and to the heating effect of the projector lamp. Also, some films have different sprocket hole spacing or have been stretched. As a result, the film being taken off at the center of the coil will change phase and come off at a different angular position than where it was taken off initially. At times, this change in takeoff location is sufficient to cause the film to wrap around the center takeoff plate and cause damage to the film. One approach to overcoming this problem is provision of a film accumulator on the support post, as is done in some prior art devices. However the capacity of such film accumulators is limited and the action of the accumulator can only be adjusted manually by an operator. Also, when the film is initially loaded on the platter and the head end of the film is to be joined to the tail end, a favorable takeoff angle for the film entering the takeoff roller assembly is not always possible. This means that the operator must either cut some of the film to shorten it or add some leader to lengthen it. Both of these options are undesirable.

The present invention provides a solution for these problems without encountering the objections of the prior solutions. In the present invention, the takeoff roller assembly is positioned above the film platter and spaced from the film platter as shown in FIG. 1, preferably being supported on an arm from the upright post. This provides a space between the takeoff roller assembly and the film coil wherein the film can move in any direction. This configuration makes the machine insensitive to the phase angle of the film takeoff point and also does away with the requirement for the film accumulator. It also eliminates the possibility of the film loops pinching off film between a loop and the takeoff roller assembly.

The friction pads 170 positioned at the arcuate portions of the platter provide a continuous resistance surface at the arcuate sections for aid in cusp formation. These continuous pads provide improved control of the film and positive loop formation with substantially with all types of film and film conditions. In the prior art apparatus which relies on film tension for the cinching action, the utilization of a continuous friction surface would not be possible because the continuous friction surface would substantially increase the tension required to move the film inward. However, with the pusher roller of the present invention, the increase in resistance to film movement is not a factor.

The pads 170 could extend substantially to the center of the platter, but are not of as great importance at the inner portions of the platter. Hence the preferred configuration is to have the continuous pads 170 extend from the periphery inward for about ¼ of the radius.

Figure 16:
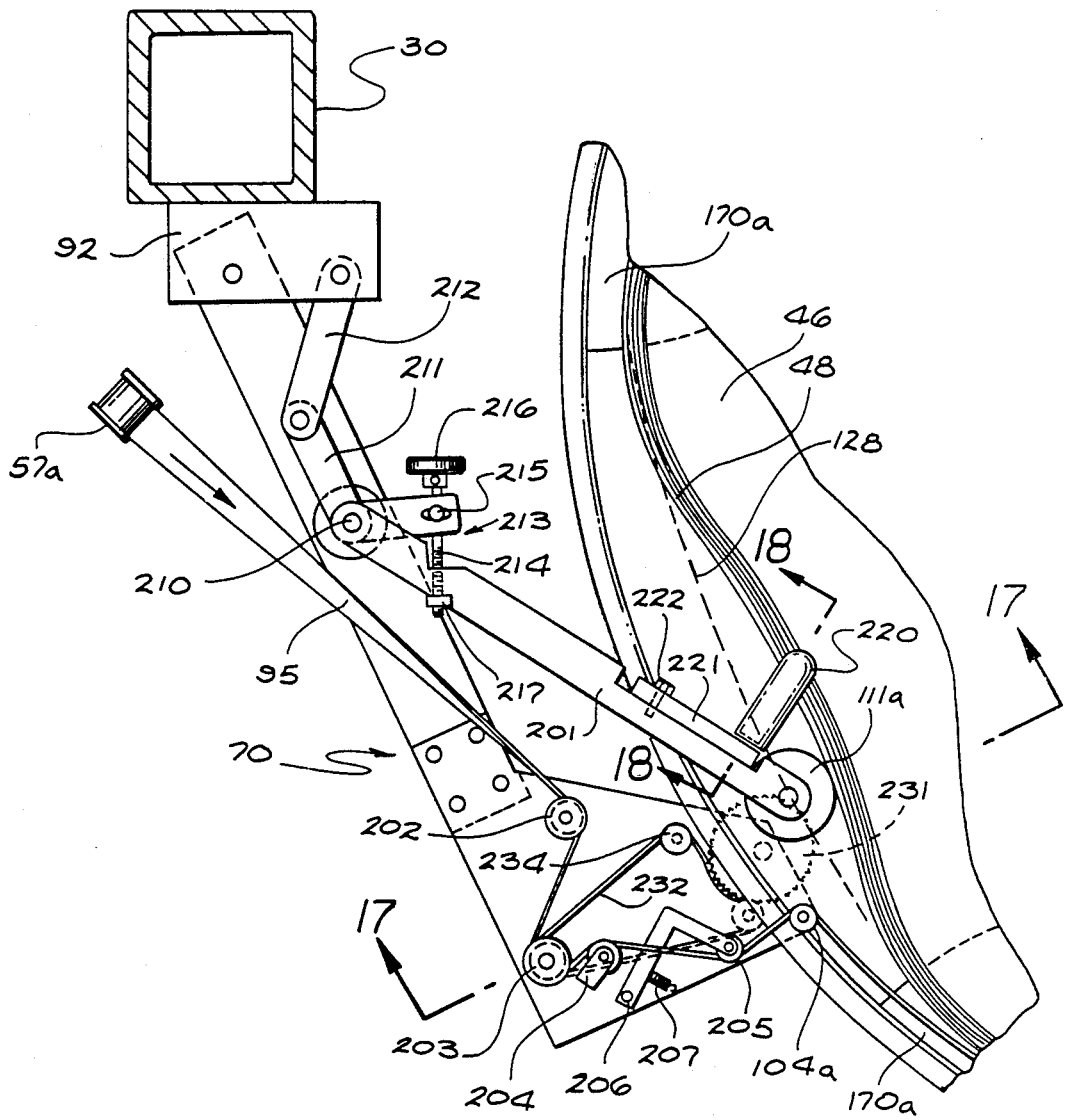
FIG. 16 is a view similar to that of FIG. 4 showing an alternative and presently preferred embodiment of the invention.

In the embodiment illustrated in FIG. 16, the relationship of the application roller and the pusher roller is modified. The pusher roller 111a is carried on an arm 201 which is pivotally mounted on the application arm 70, in a manner to be described. With this modified arrangement, the pusher roller can be in contact with the outer layer of film on the coil 48 during the entire revolution of the platter. The film application roller 104a, which may be smaller in diameter than previously shown, is carried on the arm 70 and positioned so that preferably it does not contact the coiled film 48. The film coming from the projector passes over the roller 57a, corresponding to the roller 57 in the earlier embodiment, and around roller 202 and sprocket 203 on the arm 70, past a conventional failsafe roller 204 and a tensioning roller 205, leading to the application roller 104a. The tensioning roller is carried on an arm 206 pivotally mounted on the arm 70, with a spring 207 providing the desired film tension at the application roller.

The arm 201 is pivotally mounted on a post 210 carried on the arm 70. A crank arm 211 is also pivotally mounted on the post 210, with one arm of the crank arm 211 connected to the plate 92 by a link 212, and with the other arm of the crank arm connected to the arm 201 by an adjustment mechanism 213. The adjustment mechanism 213 provides for adjusting the angular relation between the arm 201 and the crank arm 211, and typically comprises a shaft 214 riding in a collar 215 carried on the crank arm 211 and threaded into the arm 201. Rotation of the shaft 214 by the knob 216 moves the arm 201 with respect to the crank arm, and a nut 217 serves to lock the adjustment mechanism in the set position.

Figure 18:
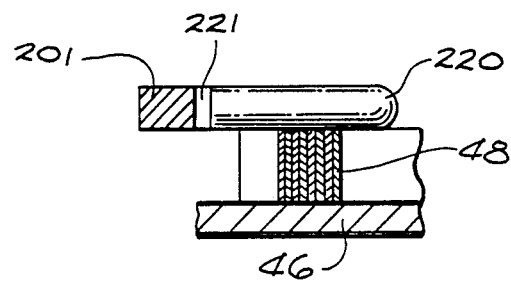
FIG. 18 is an enlarged partial sectional view taken along the line 18—18 of FIG. 16.

In the preferred embodiment, a roller 220 is carried in the horizontal position on an arm 221 in turn attached to the arm 201 by a screw 222. The operation of the roller 220 is best illustrated in FIG. 18, with the roller being positioned to overlay the film coil 48 and urge the successive layers of the coil downward into contact with the platter to provide a uniform coil.

In the preferred embodiment illustrated in FIGS. 16–20, the platter 46 is made circular, and typically is formed of a honeycomb core 225 with upper and lower skins 226, 227, respectively. A compressable extrusion 228 is inserted in the outer edge between the upper and lower skins, to serve as an end cap and protective rim.

The gear belt 128 is cemented to the bottom of the platter 46, directly or with an intermediate support member, in the same configuration as in the earlier embodiment, with alternating straight and arcuate sections. As illustrated in FIGS. 16 and 17, a gear 231 journaled in the arm 70 engages the gear belt 128 and drives a sprocket drive belt 232. The belt 232 is maintained in engagement with the gear 231 by rollers 234, 235, and drives a sprocket 236 on shaft 237 which also carries the sprocket 203 which serves as the metering sprocket for film advance.

If desired, a follower roller 240 may be carried on an arm 241 which swivels on the arm 70, with the follower roller 240 engaging the inner side of the gear belt 128 for maintaining the gear 231 and gear belt in engagement.

Preferably the follower roller 240 is mounted on a release linkage 242 which is actuated by lever 243 to provide for disengagement of the drive gear and gear belt.

In the prior described embodiment at FIG. 11, a plurality of skid strips 180, 182, 184, are positioned on the upper surface of the platter. In the embodiment as shown in FIGS. 19 and 20, the orientation of these skid strips 180a, 182a, 184a is changed, and skid ramps 240 are added. The ramps be made of the same material as the strips. Each of the skid ramps 240 has an outer curve preferably corresponding to the periphery of the platter, and an inner curve corresponding to the periphery of a cusp. The skid ramp typically is formed of a sheet of the low friction material with a wedge 241 positioned between the sheet 240 and the top of the platter, as best seen in FIG. 20.

In operation, the outer layer 242 of film laid down by the application roller 104a initially is at the outer periphery. As successive layers of film are added at the periphery, the film is pushed radially inward by the pusher roller 111a, with the film sliding along the skid ramp 240. After a number of layers of film have been applied, the initial layer 242, now identified as 242a in FIG. 20, moves over the inner cusp shaped end of the skid ramp 240 and drops down onto the platter and skid strips. The film at 242a is formed into the desired cusp shape as defined by the inner edge of the skid ramp. While only film layers 242 and 242a are shown in FIGS. 19 and 20 for purposes of clarity, it should be understood that there will be a plurality of layers of film filling the space between 242 and 242a.

The earlier embodiment as shown in FIG. 11 also included friction producing pads 170, and a variation on this construction is shown in FIGS. 17 and 19. Pads 170a are placed on the platter in a manner similar to that of pads 170, for the same purpose, namely for providing some resistance to inward movement of the film. In addition, a filler pad 244 is positioned under a portion of each pad 170a, with the outer periphery of the filler pad having an arc corresponding to that of the periphery of the platter. Each filler pad provides a ramp or cliff 245 in the friction pad 170a which functions to form the film into the desired arcuate configuration as the inwardly moving film is moved upward over the transition, as seen in FIG. 17.

In the operation of the embodiment as shown in FIGS. 16–20, the arm 70 is moved toward and away from the center of the platter as the platter rotates, by engagement of the gear 235 with the gear belt 128. The pusher roller 111a is similarly moved in and out, and maintains substantially continuous contact with the outer layer of film, pushing the film inward toward the desired configuration. This is accomplished without any cinching action on the film.

In the specific embodiment illustrated, the arm 201 which carries the pusher roller 111a is actuated by a linkage comprising the arm 70, the plate 92, the link 212, and the crank arm 211. With this linkage arrangement, as the arm 70 moves inward a particular amount, the linkage causes the arm 201 to move inward by a greater amount, thereby improving the formation of the cusp. The position of the roller 111a with respect to the arm 70 may be adjusted by means of the adjustment mechanism 213.

Figure 21:
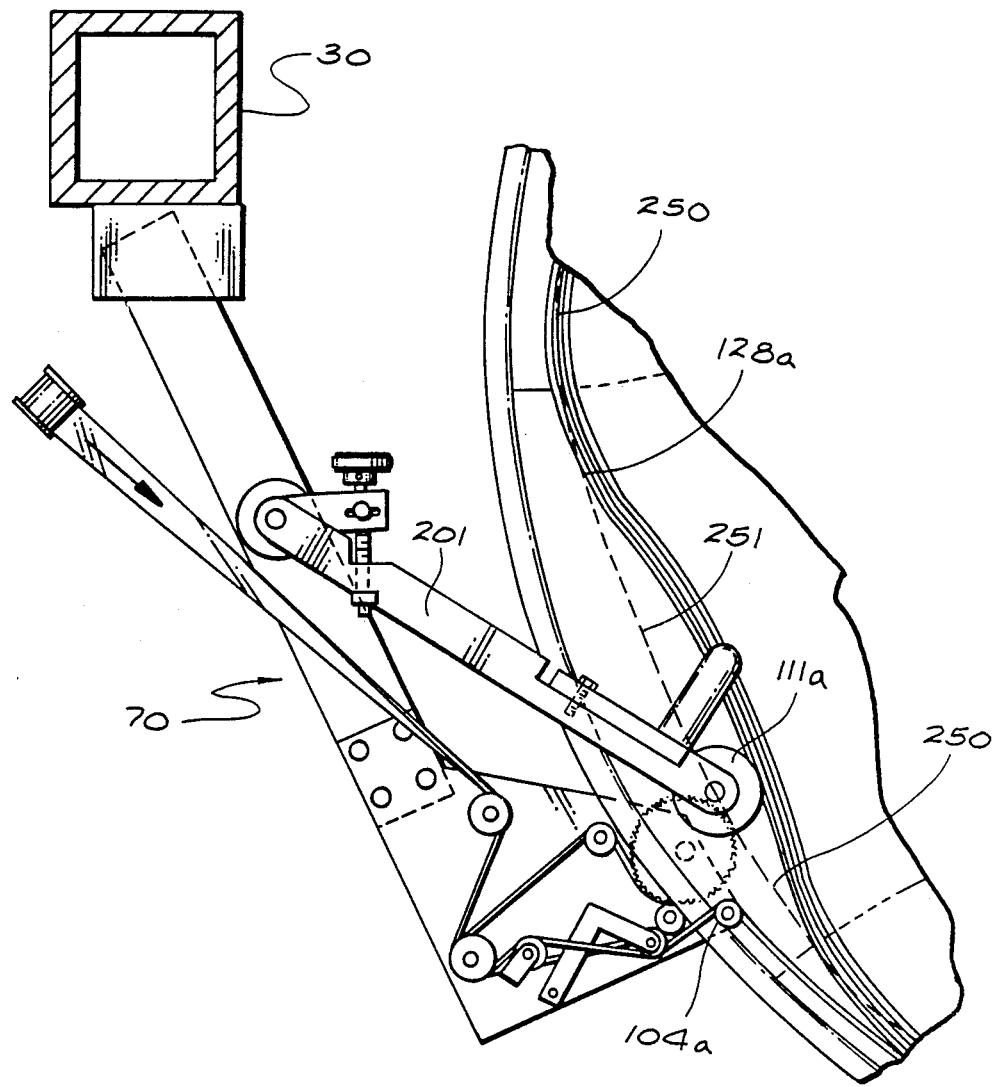
FIG. 21 is a view similar to that of FIG. 16 showing another alternative embodiment of the invention.

In another alternative embodiment as shown in FIG. 21, the linkage for driving the arm 201 with respect to the arm 70 is omitted, and the pusher roller 111a and the application roller 104a move in and out the same angular amount.

Also in this embodiment, the cam track or gear belt 128a has a different configuration than in the prior embodiment, comprising alternating arcuate sections 250 and cusp shaped sections 251, corresponding to the desired shape of the outer layer of film on the platter. The FIG. 21 construction is otherwise the same as that of FIG. 16.

Figure 22:
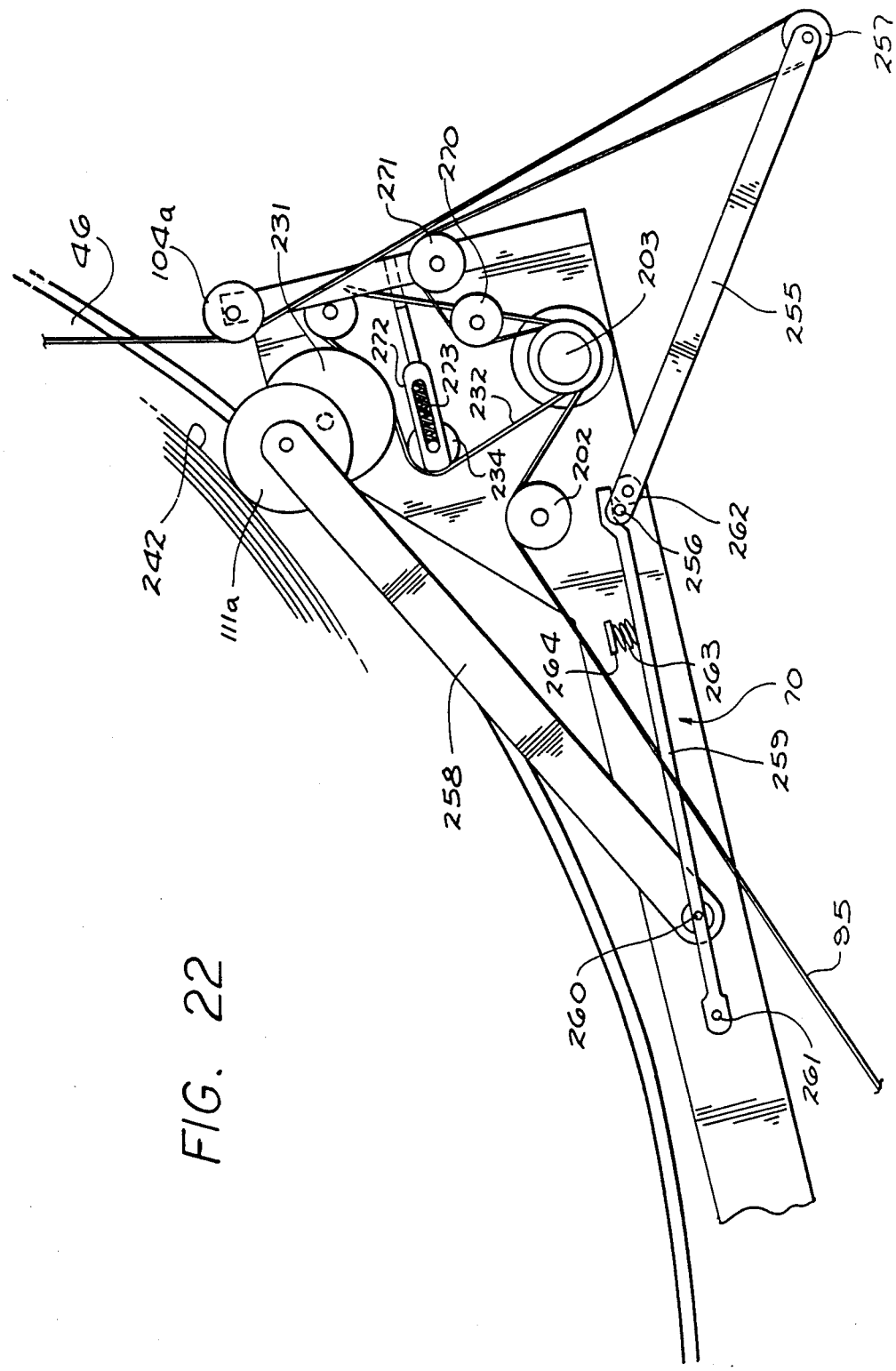
FIGS. 22 and 23 are views similar to that of FIG. 16 showing another embodiment of the invention providing automatic adjustment of film tension during application to the platter.
Figure 23:
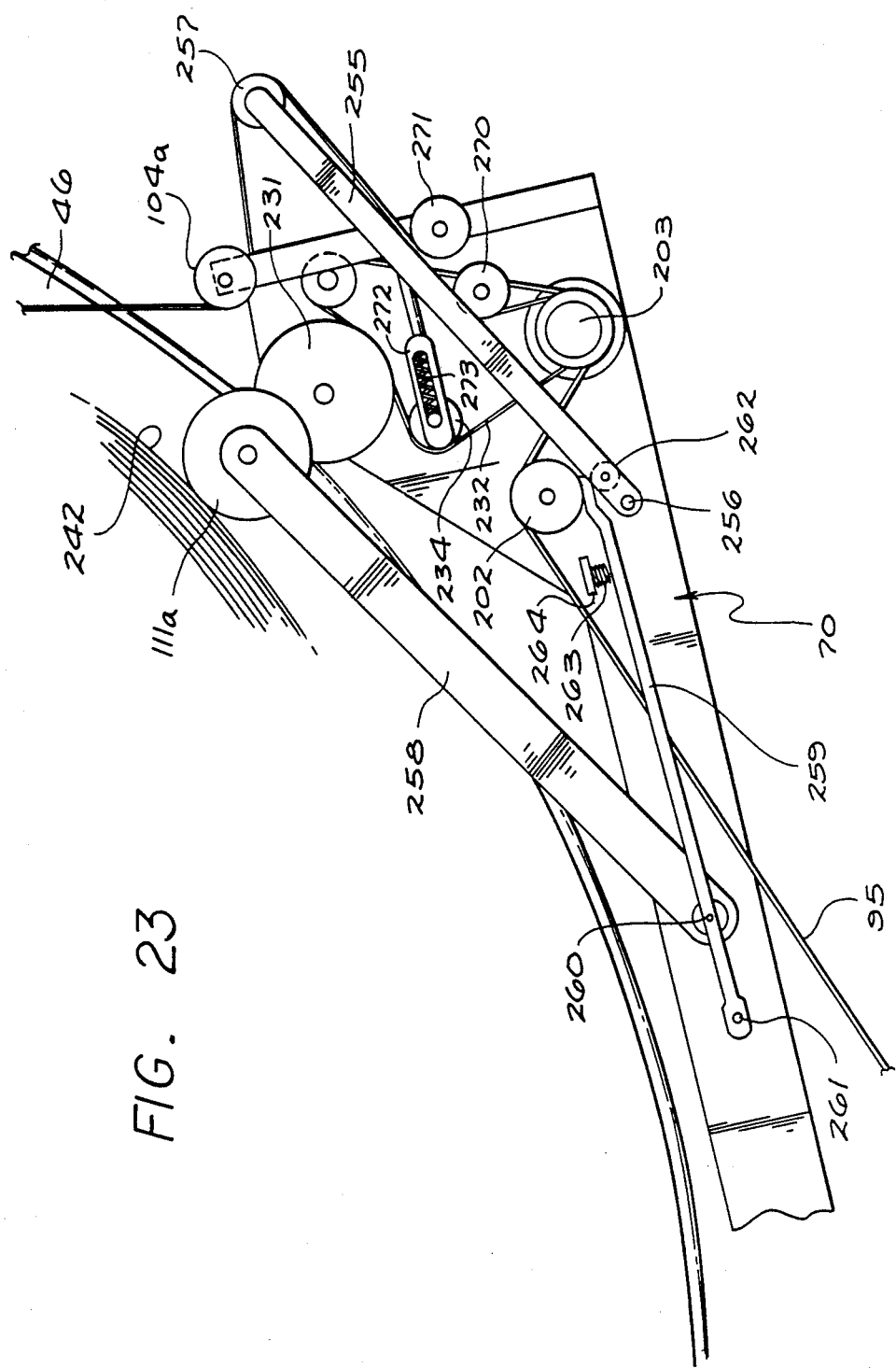

An arrangement for monitoring the amount of film being taken up on the platter during each revolution is shown in FIGS. 22 and 23, wherein components corresponding to those previously described are identified by the same reference numbers. A tension arm 255 is pivotally mounted on the arm 70 at a pivot pin 256, with a tension arm roller 257 rotatably mounted at the outer end of the tension arm 255. The pusher roller 111a is carried on a pusher arm 258 which is pivotally mounted on a lever 259 at a pivot pin 260. The lever 259 is pivotally mounted on the arm 70 at a pivot pin 261, with the other end of the lever 259 engaging a roller 262 carried on the tension arm 255. The lever 259 is urged against the roller 262 by a compression spring 263 positioned between the lever 259 and a mounting bracket 264 carried on the arm 70.

The incoming film strip 95 moves around roller 202, sprocket 203, rollers 270 and 271, roller 257, and roller 104a to the coil on the platter.

The installation and operation of the belt 232 is essentially the same as that shown in FIG. 16, with the tension for the belt now being provided by the roller 234 mounted in a slot in an arm 272, and urged outward by a spring 273.

The tension arm 255 is shown in the film loose position in FIG. 22, and the film tight position in FIG. 23. The spring 263 urges the tension arm to the loose film position. When the tension arm rotates counter-clockwise, engagement of the roller 262 with the end of the lever 259 causes the lever to rotate counter-clockwise and move the pivot point of the pusher arm 258 at pin 260 inward toward the center of the film coil.

This arrangement provides a feedback type of operation for monitoring the amount of film being taken up on the platter as the platter rotates. It has been determined that the length of film per sprocket hole can vary from one film to another and can vary with variations in environmental conditions. Therefore it is desirable to provide an automatic control for the amount of film being wound onto the platter per revolution. In the present arrangement, this is carried out by determining the amount of slack in the film accumulated by the tension arm as the angular position of the tension arm changes. This is used for positioning the pusher roller 111a in a manner to change the circumference of the film being laid onto the platter. The pusher roller position adjusts automatically with the change in position of the tension arm so that the outer circumference of the coil of film on the platter will equal the length of film being metered onto the platter with each revolution of the platter.

Loose film or slack in the film between the sprocket 203 and the platter will permit the tension arm to rotate clockwise away from the platter under the action of the spring 263. The linkage between the tension arm and the pusher roller moves the pusher roller outward away from the center of the platter and effectively increases the radius of the position of film being laid-down on the platter. Conversely, tightening of the film will rotate the tension arm counter-clockwise and thereby move the pusher roller inward toward the center of the platter with- the result that the film is applied onto the platter at a shorter radius.

I claim:

1. In an apparatus for continuously storing a strip of material in a coil, the apparatus including a flat platter and drive means for rotating said platter,
   a cam mounted for rotation with said platter about its center, said cam having a cam track with alternating sections of greater distance from said center and lesser distance from said center, and
   means for applying the incoming strip to the periphery of said coil of the strip on said platter as said platter rotates, said means for applying including a cam follower for engaging said cam track and varying the distance from said center to the point of application of the strip, and first roller means adjacent said platter for guiding the incoming strip onto said coil, with said means for applying moving toward and away from said center and with said coil on said platter having inwardly directed rounded cusps with arcuate outer peripheries therebetween,
   the improvement comprising second roller means fixedly mounted adjacent said platter and positioned in engagement with said coil only at the arcuate outer peripheries thereof for urging said coil inward toward said center and relieving tension in said strip.

2. An apparatus as defined in claim 1 wherein the position of said second roller means relative to said platter is adjustable.

3. An apparatus as defined in claim 1, wherein said cam follower includes a first gear and said cam track includes a second gear, with said first and second gears engaging each other for driving said first gear as a function of rotation of said cam and platter.

4. An apparatus as defined in claim 3, wherein said means for applying the strip includes:
   a sprocket for advancing the strip at a controlled rate; and
   means for coupling said first gear with said sprocket for driving said sprocket to cyclically increase and decrease the rate at which the incoming strip is applied to said coil.

5. An apparatus as defined in claim 1, including means for providing a continuous and friction producing surface on said platter over that portion of said platter over said cam track sections of greater distance from said center, and extending from adjacent the periphery of said platter at least part way to said center.

6. An apparatus as defined in claim 1, including:
   a strip takeoff roller assembly for positioning between the coil of the strip at the center of said platter and a strip use device, said assembly including at least first and second rollers mounted on a support plate for moving the strip therebetween; and means for mounting said roller assembly above said platter for spacing said roller assembly upward from the coil of the strip.

7. An apparatus as defined in claim 1 wherein said second roller means is positioned on said means for applying for continuously engaging said coil as it rotates.

8. An apparatus as defined in claim 7 wherein the periphery of said second roller means is at a lesser distance from said center than the periphery of said first roller means for spacing said first roller means from said coil.

9. An apparatus as defined in claim 1 wherein said means for applying includes a film application controller comprising:
a tension arm pivotally mounted on said means for applying for movement between strip loose and strip tight position;
a tension roller carried on said tension arm;
spring means carried on said means for applying for urging said tension arm toward said strip loose position; and
strip guide means for guiding the incoming strip around said tension arm strip roller upstream of said first roller means.

10. An apparatus as defined in claim 9 including:
a pusher arm with said second roller means carried thereon;
a tension arm lever pivotally mounted on said means for applying and engaging said tension arm for movement with said tension arm; and
means for mounting said pusher arm on said tension arm lever.

11. An apparatus as defined in claim 1, wherein said means for applying includes:
a film drive sprocket;
a spring loaded tensioning roller;
an endless drive belt;
means for positioning said drive belt for engaging said cam follower and said sprocket, with the strip of material moving around said sprocket past said tensioning roller and said first roller means onto said coil.

12. An apparatus as defined in claim 1 wherein said means for applying includes a four link movement comprising:
a first arm as the first link, with said cam follower and said first roller means mounted thereon;
a second arm as the second link and pivotally mounted on said first arm at an intermediate point of said second arm, with said second roller means mounted thereon;
a bracket as the third link, with said first arm pivotally mounted thereon; and
a link member as the fourth link and connected between said bracket and said second arm.

13. An apparatus as defined in claim 12 wherein said second arm comprises a crank arm with two ends joined at said intermediate point, and including means for adjusting the angle between said two arms.

14. An apparatus as defined in any of claims 1-13, wherein said cam track has three sections of said greater distance alternating with three sections of said lesser distance.

15. An apparatus as defined in any of claims 1-13 wherein said cam track has at least three arcuate sections alternating with straight sections.

16. An apparatus as defined in any of claims 1-13 wherein said cam track has at least three arcuate sections alternating with inwardly directed cusp sections.

17. An apparatus as defined in claim 1 including a strip laydown roller carried on said means for applying, with the axis of rotation of said laydown roller substantially parallel to the upper surface of said platter and with said laydown roller disposed to overlay said coil at the periphery thereof for applying a downward force to the strip.

18. An apparatus as defined in claim 1 wherein said cam has an inner surface and an outer surface, with said cam follower rotating on an axis and engaging said outer surface, and including
a follower arm pivotally mounted on said means for applying on said cam follower axis, and
a follower roller carried on said cam follower arm and engaging said cam inner surface for maintaining said cam follower and said cam in engagement.

19. An apparatus as defined in claim 1 wherein said platter is circular, and said cam track is carried on said platter with said alternating sections of greater distance from said platter center and lesser distance from said platter center projecting downward from said platter.

20. An apparatus as defined in claim 1 including skid means positioned on that portion of said platter over said cam track sections of lesser distance from said center and extending from adjacent the periphery of said platter part way to said center, said skid means terminating at the inner edge thereof in a cusp shape.

21. An apparatus as defined in claim 20 wherein said skid means has a ramp shape in vertical cross section, with the ramp rising in the inward direction and terminating in a substantially vertical edge.

22. An apparatus as defined in claim 1 including means for providing a continuous and friction producing surface on said platter over that portion of said platter over said cam track sections of greater distance from said center, and extending from adjacent the periphery of said platter at least part way to said center,
with said friction producing surface having a lower level and a higher level with the outer edge of said higher level of an arcuate shape and positioned inward of said lower level.

23. In an apparatus for continuously storing a strip of material in a coil, the apparatus including a flat platter and drive means for rotating said platter,
a cam mounted for rotation with said platter about its center, said cam having a cam track with alternating sections of greater distance from said center and lesser distance from said center, and
means for applying the incoming strip to the periphery of said coil of the strip on said platter as said platter rotates, said means for applying including a cam follower for engaging said cam track and varying the distance from said center to the point of application of the strip, and first roller means adjacent said platter for guiding the incoming strip onto said coil, with said means for applying moving toward and away from said center and with said coil on said platter having inwardly directed rounded cusps with arcuate outer peripheries therebetween,
the improvement wherein said means for applying includes a film application controller comprising:
a tension arm pivotally mounted on said means for applying for movement between strip loose and strip tight positions;

a tension roller carried on said tension arm;

spring means carried on said means for applying for urging said tension arm toward said strip loose position;

strip guide means for guiding the incoming strip around said tension arm strip roller upstream of said first roller means;

second roller means;

a pusher arm with said second roller means carried thereon adjacent said platter for engaging said coil at the periphery thereof for urging said coil inward toward said center;

a tension arm lever pivotally mounted on said means for applying and engaging said tension arm for movement with said tension arm; and means for mounting said pusher arm on said tension arm lever.

24. In an apparatus for continuously storing a strip of material in a coil, the apparatus including a flat platter and drive means for rotating said platter, a cam mounted for rotation with said platter about its center, said cam having a cam track with alternating sections of greater distance from said center and lesser distance from said center, and means for applying the incoming strip to the periphery of said coil of the strip on said platter as said platter rotates, said means for applying including a cam follower for engaging said cam track and varying the distance from said center to the point of application of the strip, with said means for applying moving toward and away from said center and with said coil on said platter having inwardly directed rounded cusps with arcuate outer peripheries therebetween, the improvement comprising skid means positioned on that portion of said platter over said cam track sections of lesser distance from said center and extending from adjacent the periphery of said platter part way to said center, said skid means terminating at the inner edge thereof in a cusp shape.

25. An apparatus as defined in claim 24 wherein said skid means has a ramp shape in vertical cross section, with the ramp rising in the inward direction and terminating in a substantially vertical edge.

26. An apparatus as defined in any of claims 24 and 25, including means for providing a continuous and friction producing surface on said platter over that portion of said platter over said cam track sections of greater distance from said center, and extending from adjacent the periphery of said platter at least part way to said center, with said friction producing surface having a lower level and a higher level with the outer edge of said higher level of an arcuate shape and positioned inward of said lower level.

27. In a method for continuously storing a strip of material on edge in a coil on a rotating platter wherein the strip is applied at the periphery of the coil and taken off at the center of the coil, and wherein the strip is applied by a cam follower engaging a cam track having alternating sections of greater distance from the center and lesser distance from the center with the coil having inwardly directed rounded cusps with arcuate outer peripheries therebetween, the improvement comprising the step of contacting the coil only at the arcuate outer periphery and urging the coil inward toward the center thereby relieving tension in the strip of material in the coil.

28. The method as defined in claim 27 including continuously contacting the coil with a roller as the coil rotates.

29. The method as defined in claim 28 including contacting the coil along a path comprising alternate arcuate sections and inwardly directed cusp sections.

30. The method as defined in claim 28 including contacting the coil along a path comprising alternate arcuate sections and straight sections.

31. The method as defined in claim 28 including:

metering the strip onto the platter;

contacting the coil with a pusher roller as the coil rotates; and automatically adjusting the pusher roller position so that the outer circumference of the coil on the platter will substantially equal the length of strip being metered onto the platter with each revolution of the platter.

32. The method as defined in any of claims 27-31, including the step of taking off the strip of material from the center of the coil through a takeoff roller assembly positioned above and spaced upward from the coil with the strip moving freely horizontally over the upper surface of the coil.

* * * * *